(12) United States Patent
Corcoran et al.

(10) Patent No.: US 9,222,534 B2
(45) Date of Patent: Dec. 29, 2015

(54) CALIPER DISK BRAKE AND WEAR INDICATING DEVICE OF SUCH A BRAKE

(71) Applicant: WABCO Europe BVBA, Brussels (BE)

(72) Inventors: Thomas Corcoran, Leonard, MI (US); Norman Oha, Oxford, MI (US); Markus Stafflinger, Bensheim (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 14/281,504

(22) Filed: May 19, 2014

(65) Prior Publication Data

US 2015/0330469 A1 Nov. 19, 2015

(51) Int. Cl.
*B60L 7/00* (2006.01)
*F16D 66/02* (2006.01)
*F16D 55/225* (2006.01)

(52) U.S. Cl.
CPC .............. *F16D 66/02* (2013.01); *F16D 55/225* (2013.01)

(58) Field of Classification Search
USPC ......... 188/1.11 E, 1.11 L, 1.11 W, 71.7–71.9, 188/72.7–72.9, 158
See application file for complete search history.

(56) References Cited

U.S. PATENT DOCUMENTS

| | | | | |
|---|---|---|---|---|
| 4,356,897 | A * | 11/1982 | Urban | 188/1.11 W |
| 4,658,936 | A * | 4/1987 | Moseley | 188/1.11 R |
| 5,848,672 | A * | 12/1998 | Brearley et al. | 188/1.11 L |
| 6,098,763 | A * | 8/2000 | Holding | 188/158 |
| 7,849,982 | B1 * | 12/2010 | Tamura et al. | 188/250 G |
| 2006/0090968 | A1 * | 5/2006 | Taylor et al. | 188/1.11 L |
| 2007/0256901 | A1 * | 11/2007 | Niehorster et al. | 188/71.7 |

* cited by examiner

*Primary Examiner* — Christopher Schwartz
(74) *Attorney, Agent, or Firm* — Downs Rachlin Martin PLLC

(57) ABSTRACT

A caliper disk brake, particularly for commercial vehicles, comprising a carrier, a caliper, at least one brake pad, and an indicating device capable of indicating wear of said brake pad. Said indicating device comprises a screw drive converting a linear movement of said pad with respect to said carrier into a rotational move-ment. Moreover, the invention may include a wear indicating device of such a disk brake.

20 Claims, 3 Drawing Sheets

CALIPER DISK BRAKE AND WEAR INDICATING DEVICE OF SUCH A BRAKE

FIELD OF THE INVENTION

The invention relates to a caliper disk brake, particularly for commercial vehicles, comprising a caliper, a carrier, at least one brake pad and an indicating device capable of indicating wear of said brake pad.

BACKGROUND

Disk brakes as mentioned above are known. The known brakes include electronic indicating devices to indicate the wear of the brake pad. In other disk brakes, the pad wear is measured using a tape measure or a ruler. Such a measurement is not sufficiently precise. What is also known is to measure the pad wear via a pin extending more or less from the caliper or the carrier of the brake, depending on the wear of the brake pad. Like the electronic indicating devices, these known solutions are laborious and complicated. Moreover, said pin can get jammed due to dirt making the measurement incorrect.

One embodiment of the present invention is directed to a caliper disk brake as mentioned above which is simpler, particularly with view to the indicating device, while providing a correct and precise wear indication.

According to one embodiment of the invention, the indicating device comprises a screw drive converting a linear movement of said pad with respect to said carrier into a rotational movement.

Advantageously, such a converting gear is a very simple part and easy to manufacture. The angle of the rotational movement gives sufficient information about the wear of the pad because said wear corresponds to a respective linear movement of (a back plate of) the pad with respect to the carrier. This is particularly true for the part of the linear movement resulting from wear compensation performed by a respective adjusting device integrated into the brake.

In one embodiment, said screw drive comprises a screw and a nut, said nut cooperating with said screw to rotate if linearly moved relative to said screw.

Said nut can be provided in various forms, particularly in the form of a sleeve.

According to one embodiment of the invention, the screw is held non-rotatable. Thereby, it is guaranteed that any rotation of the nut merely results from a linear movement of the pad and thereby of the screw relative to the carrier.

To enhance accuracy of the wear indication, to the invention may include a spring urging said nut to move away from said screw in response to wear of said brake pad. In other words, said spring is used to reliably hold said nut axially so that all the movement of the screw results from respective movement of the pad.

Said indicating device, in one embodiment, comprises a display means.

Said display means can be provided in various forms. In one embodiment, said display means comprises at least a first field related to a still tolerable wear and a second field related to a no more tolerable wear. With this embodiment of the invention, a user can take from the indicating device whether or not the wear of the pad is still tolerable or whether the pad must be replaced because the wear is no longer tolerable, based on which one of the first and second fields is displayed.

According to a further embodiment of the invention, what is provided is a protecting means protecting said display means from the environment, particularly from dirt, stones and the like.

Said protecting means may, in one embodiment, comprise a window through which a wear indicating information can be seen. Such a wear indicating information can, for example, be said first or said second field. If the first field can be seen through the window, a user knows that the pad is still ok. If, however, the second field can be seen through the window, the user knows that the pad is to be replaced. Instead of a window, what can be provided is a marker, said marker marking either the first or the second field, depending on the wear of the pad.

To simplify the overall construction, said protection means is, in one embodiment, held non-rotatable.

In addition to the above disk brake, the invention may also provide a wear indicating device for such a disk brake.

SUMMARY OF THE DISCLOSURE

In one implementation, the present disclosure is directed to a caliper disk brake. The caliper includes a carrier, a caliper, a least one brake pad, and an indicating device capable of indicating a wear of said brake pad, wherein said indicating device comprises a screw drive converting a linear movement of said at least one brake pad with respect to said carrier into a rotational movement.

In another implementation, the present disclosure is directed to a wear indicating device for use in a caliber disk brake including a carrier, a caliber, and at least one brake pad, the indicating device including a screw drive for converting a linear movement of the at least one brake pad with respect to the carrier into a rotational movement; and display means associated with said screw drive for displaying the extent of wear of said at least one brake pad.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
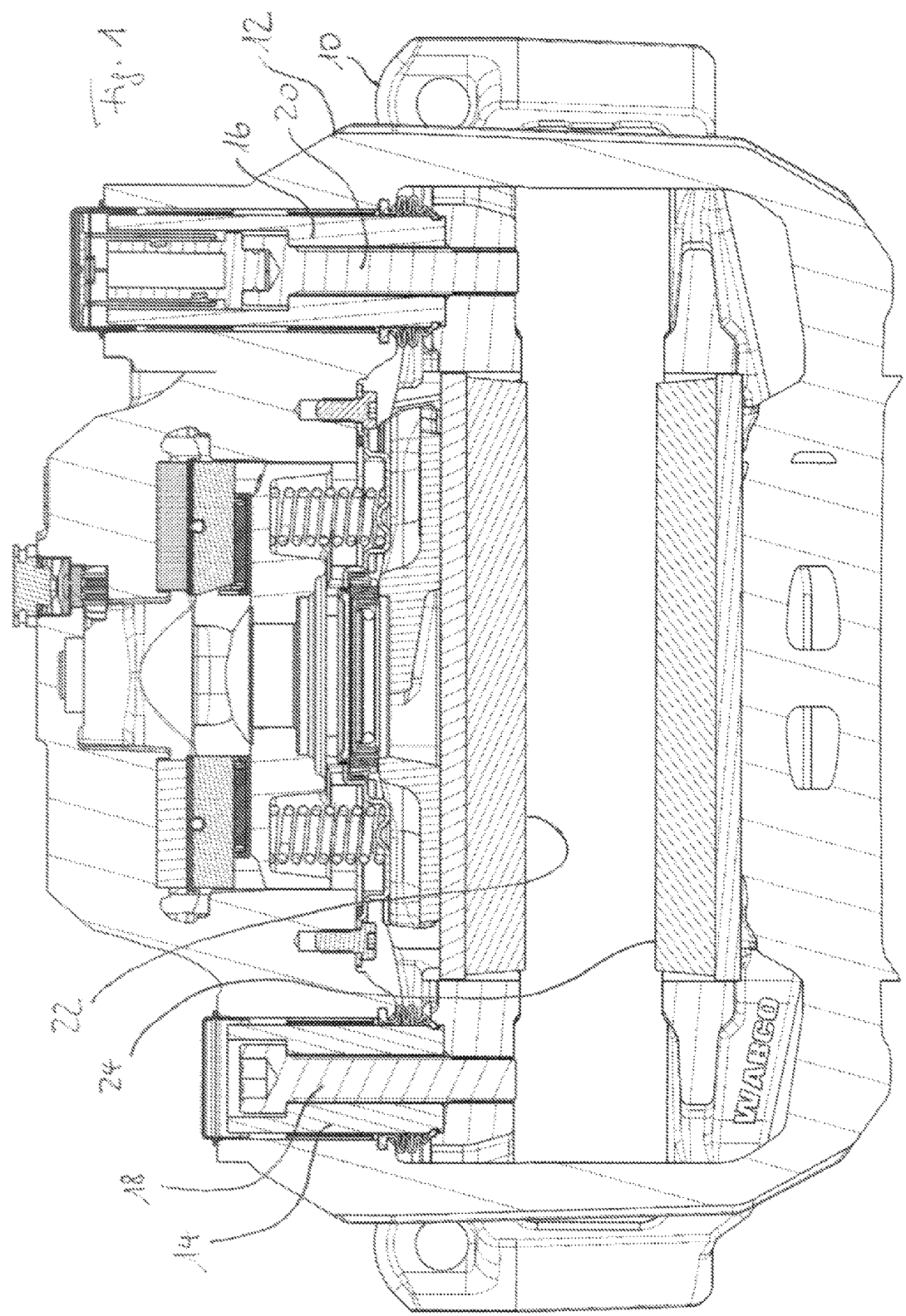
FIG. 1 is a schematic partly cutaway top view of a brake disk according to one embodiment of the invention.

The disk brake shown in the accompanied drawings comprises a carrier 10 and a caliper 12. Caliper 12 is held slidably with respect to carrier 10 by sleeves 14, 16, which are fixed to carrier 10 by bolts 18, 20 and on which caliper 12 can slide.

Said brake furthermore includes brake pads 22, 24 which are urged against a brake disk (not shown) when the brake is activated.

Figure 2:
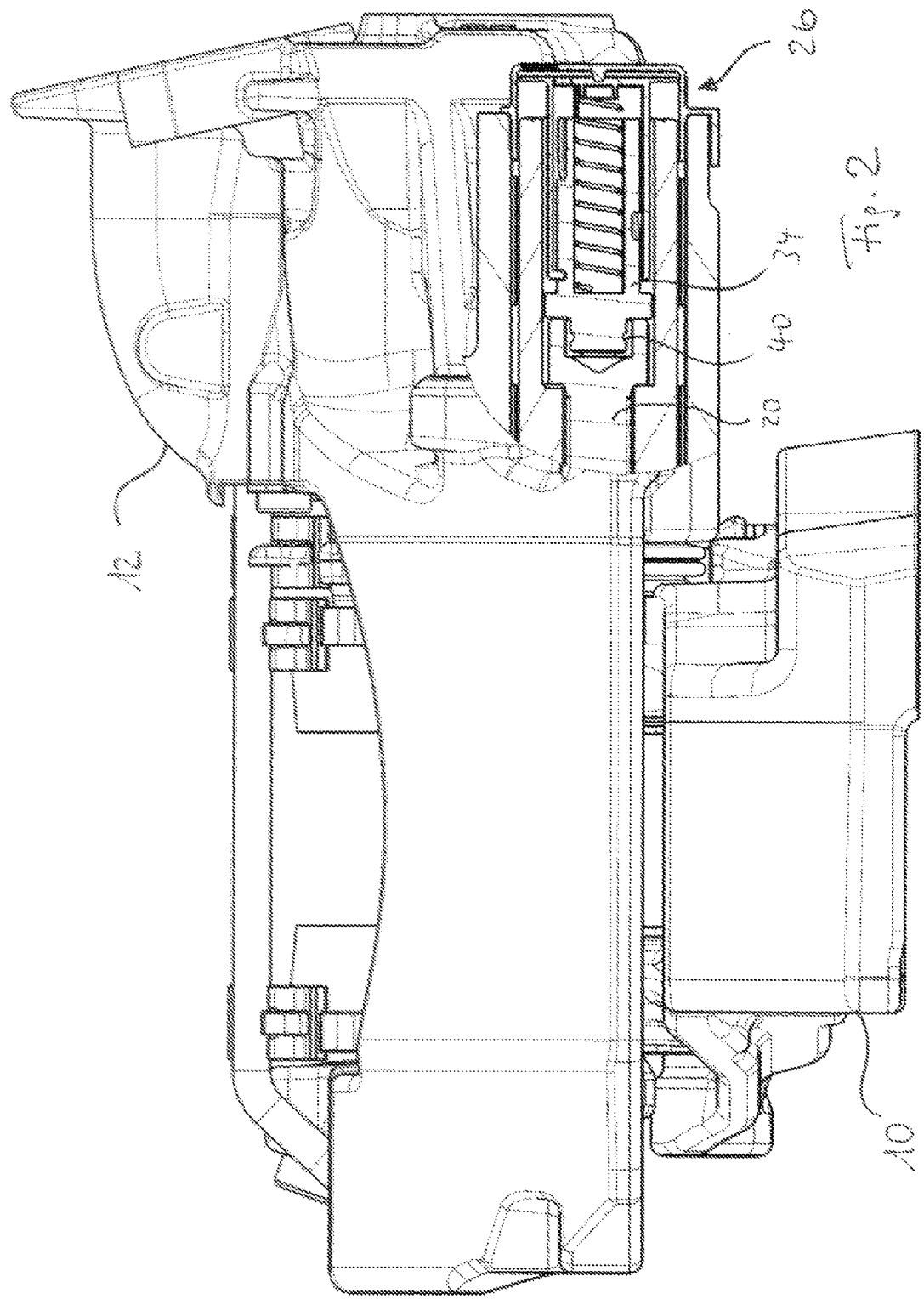
FIG. 2 is a schematic partly cutaway side view of the brake of FIG. 1.

Corresponding to the wear of brake pads 22, 24, caliper 12 is shifted relative to carrier 10 to the right-hand side in FIG. 2 or upwards in FIG. 1, respectively. To this end, what is provided in the brake shown in the drawings is an automatic adjustment device which is perfectly known in the art and, therefore, not further explained.

Figure 3:
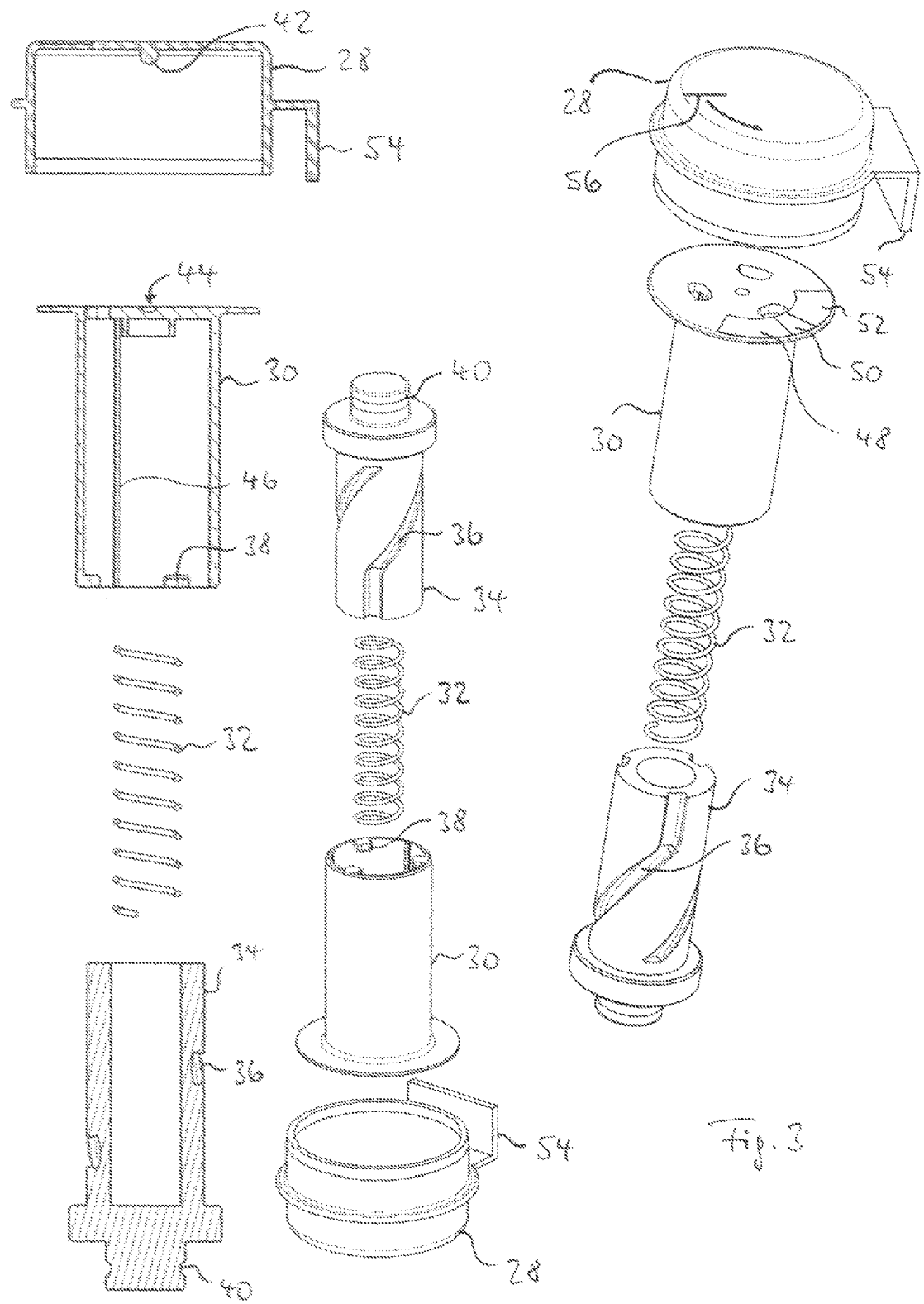
FIG. 3 is a three exploded assembly drawings of an indicating device of the brake of FIGS. 1 and 2.

To indicate the (total) wear of brake pads 22 and 24, what is provided is a wear indicating device 26, detailedly shown in FIG. 3. Said wear indicating device comprises a cap 28, a sleeve 30, a spring 32, and a screw 34. Screw 34 comprises a thread 36 and sleeve 30 comprises protrusions on its inner wall, one of these protrusions being numbered 38 in the enclosed drawings. Protrusions 38 cooperate with thread 36 so that screw 34 and sleeve 30 combine to a screw drive, with sleeve 30 being the nut.

Although not shown in the drawings, when mounted, screw 34 is provided with a rubber ring held in groove 40. Said rubber ring serves for fixing screw 34 rotationally to bolt 20, when said rubber ring in groove 40 is inserted into the hexagon socket of bolt 20.

While screw 34 is held rotationally fixed, sleeve 30 can rotate about its longitudinal axis. To this end, cap 28 is provided with a dome-shaped support 42 and sleeve 30 comprises a mating recess 44.

In the direction of the longitudinal axes of screw 34 and sleeve 30, screw 34 is coupled to bolt 20 and thereby to carrier 10, whereas sleeve 30 is coupled to caliper 12 to be reliably held axially so that it follows the axial movement of caliper 12 and is set into rotational movement due to the screw drive function.

By the way, spring 32 is not shown in FIG. 1, but in FIGS. 2 and 3.

Sleeve 30 comprises an alignment rib 46 to reliably cooperate with screw 34.

Sleeve 30 comprises a display means in form of 3 fields 48, 50, 52, which are colored. In the enclosed example, field 48 is green, field 50 is yellow, and field 52 is red.

Cap 28 may be transparent and held rotationally fixed by protrusion 54. It is particularly meant for protecting sleeve 30 and screw 34 from dirt.

Cap 28 may further comprise a marker 56.

If completely assembled and mounted to the disk brake, wear indicating device 26 is in such a status that marker 56 is positioned above green field 48 in case that pads 22, 24 are new and not yet worn.

If the brake is used, pads 22, 24 are worn, resulting in that caliper 12 is shifted in FIG. 1 upwardly and in FIG. 2 to the right-hand side with respect to carrier 10. Since screw 34 is coupled to carrier 10, whereas sleeve 30 is coupled to caliper 12, said shifting of caliper 12 with respect to carrier 10 results in a respective rotational movement of sleeve 30, so that yellow field 50 and red field 52 step by step approach marker 56. Marker 56 above yellow field 50 means a warning to a user that pads 22, 24 are soon to be replaced. If marker 56 is above red field 52, the user is informed that the wear of pads 22, 24 is no longer tolerable and they must be replaced.

In the above described embodiment, screw 34, sleeve 30, and cap 28 are made of plastic materials, with cap 28 being transparent. According to an alternative embodiment, however, cap 28 can be made of metal material with a window instead of marker 56 with fields 48, 50, 52 being visible through said window, dependent on the rotational position of sleeve 30. Said window need not be a simple opening, but may be provided with a (plastic) window pane, considering the protecting function of cap 28. Other designs for cap 28 are also encompassed by the present invention.

The features disclosed in the above specification, claims and the drawings may be essential also in various combinations for the implementation of the invention in its varied embodiment forms.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A caliper disk brake, comprising:
   a carrier,
   a caliper coupled to said carrier,
   at least one brake pad coupled to one of said carrier and said caliper, and
   an indicating device coupled to both said carrier and said caliper and being adapted to convert a linear movement of said at least one brake pad with respect to said carrier into a rotational movement indicating extent of wear of said at least one brake pad.

2. The caliper disk brake of claim 1, wherein said indicating device comprises a first member coupled to said carrier and a second member coupled to said caliper, said second member cooperating with said first member to rotate if linearly moved relative to said first member.

3. The caliper disk brake of claim 2, wherein said second member includes a display indicating the extent of wear of said at least one brake pad.

4. The caliper disk brake of claim 3, wherein said display comprises at least a first field related to a still tolerable wear and a second field related to a no more tolerable wear.

5. The caliper disk brake of claim 4, wherein said cap comprises a window through which a wear indicating information can be seen.

6. The caliper disk brake of claim 3, further including a cap protecting said display from the environment.

7. The caliper disk brake of claim 6, wherein said cap is held non-rotatable.

8. The caliper disk brake of claim 2, wherein said first member is held non-rotatable.

9. The caliper disk brake of claim 2, further including a third member urging said second member to move away from said first member in response to wear of said at least one brake pad.

10. A wear indicating device for use in a disk brake including a carrier and at least one brake pad, the indicating device comprising:
    a screw drive coupled to the carrier for converting a linear movement of the at least one brake pad with respect to the carrier into a rotational movement; and
    a display associated with said screw drive for converting said rotational movement into a display indicating an extent of wear of said at least one brake pad.

11. The wear indicating device of claim 10, wherein said screw drive comprises a screw coupled to said carrier and a nut coupled to the at least one brake pad, said nut cooperating with said screw to rotate if linearly moved relative to said screw.

12. The wear indicating device of claim 11, further including a spring urging said nut to move away from said screw in response to wear of said at least one brake pad.

13. The wear indicating device of claim 12, wherein said screw is held non-rotatable.

14. The wear indicating device of claim 10, wherein said display comprises at least a first field related to a still tolerable wear and a second field related to a no more tolerable wear.

15. A braking system, comprising:
    a carrier;
    a brake pad support coupled to said carrier, and movable with respect thereto in a first direction;
    a braking pad coupled to said brake pad support, said movement of said brake pad support indicating an extent of wear of said braking pad; and a wear indicating device coupled to said brake pad support and movable in a second direction different from said first direction, said wear indicating device being responsive to said movement of said brake pad support to display said extent of wear of said braking pad.

16. The braking system of claim 15, wherein said wear indicating device comprises a first structure non-rotationally coupled to said carrier, and a second structure rotationally coupled to said brake pad support.

17. The braking system of claim 16, further including a third structure urging said second structure to move away from said first structure in response to wear of said brake pad.

18. The braking system of claim 17, wherein said first structure comprises a screw, and said second structure comprises a sleeve.

19. The braking system of claim 18, wherein said third structure comprises a spring disposed between said screw and said sleeve.

20. A caliper disk brake, comprising:

a carrier;

a caliper;

at least one brake pad;

an indicating device capable of indicating a wear of said brake pad, wherein:
- said indicating device comprises a screw drive converting a linear movement of said at least one brake pad with respect to said carrier into a rotational movement; and
- said screw drive comprises a screw and a nut, said nut cooperating with said screw to rotate if linearly moved relative to said screw; and a spring urging said nut to move away from said screw in response to wear of said at least one brake pad.

* * * * *